United States Patent
Watanabe

(10) Patent No.: US 12,485,399 B2
(45) Date of Patent: Dec. 2, 2025

(54) HOLLOW PARTICLES, RESIN COMPOSITION AND MOLDED BODY

(71) Applicant: ZEON CORPORATION, Tokyo (JP)

(72) Inventor: Masashi Watanabe, Tokyo (JP)

(73) Assignee: ZEON CORPORATION, Tokyo (JP)

(*) Notice: Subject to any disclaimer, the term of this patent is extended or adjusted under 35 U.S.C. 154(b) by 804 days.

(21) Appl. No.: 17/778,520

(22) PCT Filed: Dec. 2, 2020

(86) PCT No.: PCT/JP2020/044783
§ 371 (c)(1),
(2) Date: May 20, 2022

(87) PCT Pub. No.: WO2021/112110
PCT Pub. Date: Jun. 10, 2021

(65) Prior Publication Data
US 2022/0410111 A1  Dec. 29, 2022

(30) Foreign Application Priority Data

Dec. 6, 2019 (JP) ................................ 2019-221624
Jun. 4, 2020 (JP) ................................ 2020-097935

(51) Int. Cl.
*B01J 13/18* (2006.01)
*C08F 2/18* (2006.01)
*C08F 220/14* (2006.01)

(52) U.S. Cl.
CPC ............... *B01J 13/18* (2013.01); *C08F 2/18* (2013.01); *C08F 220/14* (2013.01)

(58) Field of Classification Search
None
See application file for complete search history.

(56) References Cited

U.S. PATENT DOCUMENTS

2019/0016868 A1*  1/2019  Koo .......................... C08J 9/18

FOREIGN PATENT DOCUMENTS

| JP | 2002-080503 A | 3/2002 |
| JP | 2003-015171 A | 1/2003 |
| JP | 2006-257414 A | 9/2006 |
| JP | 2016-068037 A | 5/2016 |
| JP | 2016-190980 A | 11/2016 |
| WO | 2003/008461 A1 | 1/2003 |
| WO | 2004/067638 A1 | 8/2004 |

OTHER PUBLICATIONS

International Search Report dated Feb. 9, 2021, issued in counterpart Application No. PCT/JP2020/044783. (3 pages).
Notification of Transmittal of Copies of Translation of the International Preliminary Report on Patentability (Form PCT/IB/338) issued in counterpart International Application No. PCT/JP2020/044783 mailed Jun. 16, 2022, with Forms PCT/IB/373 and PCT/ISA/237. (6 pages).
Extended (Supplementary) European Search Report dated Dec. 11, 2023, issued in counterpart EP Application No. 20897500.3. (6 pages).

\* cited by examiner

*Primary Examiner* — Jeffrey D Washville
(74) *Attorney, Agent, or Firm* — WHDA, LLP

(57) ABSTRACT

Provided are hollow particles which have a high void ratio, hardly collapse, and have a reduced amount of volatile compounds. The hollow particles comprising a shell and a hollow portion surrounded by the shell, and having a void ratio of 50% or more and 90% or less, wherein the shell has a thickness of 0.2 μm or more and 0.9 μm or less, and the shell contains a polymer derived from a polymerizable monomer for shell, which is composed of 70% by mass or more and 100% by mass or less of a crosslinkable monomer and 0% by mass or more and 30% by mass or less of a non-crosslinkable monomer, and a polar resin selected from the group consisting of polymers containing a repeating unit which contains a hetero atom.

5 Claims, No Drawings

HOLLOW PARTICLES, RESIN COMPOSITION AND MOLDED BODY

TECHNICAL FIELD

The present disclosure relates to hollow particles, a resin composition, and a molded body. More particularly, the present disclosure relates to hollow particles which are hardly collapsed and have a reduced amount of volatile compounds, a resin composition containing the hollow particles and a resin, and a molded body of the resin composition.

BACKGROUND ART

Hollow particles (hollow resin particles) are particles having cavities inside the particles, and since the hollow resin particles can scatter light well and reduce the transmittance of light as compared with solid particles in which the inside is substantially filled with resin, they are commonly used in applications such as an aqueous coating material and a paper coating composition as an organic pigment or a masking agent which are excellent in optical properties such as opacity and whiteness, and are also used as additives for molded bodies such as light reflection plates, heat insulating materials, sound insulating materials, and the like.

For example, in Patent Literature 1, as hollow polymer fine particles used in a coating material, a paper coating composition, or the like, hollow polymer fine particles having a shell of a single layer which is formed of a polymer or a copolymer of at least one kind of crosslinkable monomers or formed of a copolymer of at least one kind of crosslinkable monomers and at least one kind of monofunctional monomers, are disclosed. The hollow polymer fine particles disclosed in Patent Literature 1 are obtained by dispersing a mixture composed of a crosslinkable monomer, an initiator, and a sparingly water-soluble solvent in an aqueous solution of a dispersion stabilizer and performing suspension polymerization, and do not contain a resin which has been polymerized in advance. In addition, in Examples of Patent Literature 1, hollow polymer fine particles having a shell thickness of approximately 1 μm have been obtained.

In Patent Literature 2, as hollow resin particles which can also be used as a coating agent, an additive for a molded body, and the like, hollow resin particles having a shell which has a region constituted by a non-crosslinkable polymer on a hollow side and which has no pinhole having a diameter larger than 5 nm, and having an average particle diameter of 0.05 μm to 1 μm, are disclosed. The hollow resin particles disclosed in Patent Literature 2 are obtained by dispersing a mixed solution containing a monomer mixture composed of a polyfunctional monomer and a monofunctional monomer, a non-reactive solvent, a polymerization initiator, and a non-crosslinkable polymer in an aqueous solution, and then polymerizing the mixture. In Examples of Patent Literature 2, the ratio of the polyfunctional monomer is set to 50% by weight or 35% by weight with respect to the total amount of the polyfunctional monomer and the monofunctional monomer. In Examples of Patent Literature 2, hollow resin particles having an average particle diameter of 0.19 μm to 0.36 μm and a ratio of shell thickness to average primary particle diameter of 0.13 to 0.21, have been obtained.

On the other hand, in Patent Literature 3, as hollow resin particles which are available as microcapsules, hollow resin particles which have a thermal decomposition initiation temperature of 350° C. or higher, the shell of which has a fine through-hole having a diameter within a range of 10 nm to 50 nm, and which have the shell thickness ratio of 0.03 to 0.25 with respect to an average primary particle diameter of the hollow resin particles, are disclosed. The hollow resin particles disclosed in Patent Literature 3 are obtained by dispersing a mixed solution containing a polyfunctional monomer, a non-reactive solvent, and a water-soluble polymerization initiator in an aqueous solution, and then polymerizing the mixture. They do not contain a resin which has been polymerized in advance. In the method of Patent Literature 3, by using a water-soluble polymerization initiator such as potassium persulfate as a polymerization initiator, fine through-holes tend to occur in the shell. In Examples of Patent Literature 3, hollow resin particles having an average particle diameter of 0.23 μm to 0.45 μm and a ratio of shell thickness to average primary particle diameter of 0.06 to 0.17 have been obtained.

CITATION LIST

Patent Literature

[Patent Literature 1] Japanese Patent Application Laid-Open (JP-A) No. 2002-80503
[Patent Literature 2] JP-A No. 2016-68037
[Patent Literature 3] JP-A No. 2016-190980

SUMMARY OF INVENTION

Technical Problem

Regarding hollow particles used as an additive for a molded body, it is desired to increase the void ratio of the hollow particles to be blended, and to prevent collapse of the hollow particles at the time of kneading with other materials and at the time of molding after kneading in order to improve the effects of weight reduction, heat insulation, opacification, and the like of the molded bodies. However, it has been difficult to achieve both high void ratio and strength in the hollow particles. When the hollow particles added to the molded body are collapsed, the weight reduction of the molded body by the hollow particles is not realized. Furthermore, conventional hollow particles also have a problem that volatile compounds such as a sparingly water-soluble solvent and an unreacted polymerizable monomer used in the manufacturing process tends to remain in the particles. When an attempt is made to prepare a molded body using a resin composition containing hollow particles having a large amount of volatile compounds, there is a fear that when the resin composition is kneaded, the volatile compounds in the hollow particles volatilizes and foams or causes ignition. Further, as compared with hollow particles having a small amount of volatile compounds, hollow particles having a large amount of volatile compounds have a problem in that the efficiency of weight reduction is inferior because of their high specific gravity.

The hollow polymer fine particles disclosed in Patent Literature 1 have a problem in that volatile compounds such as a sparingly water-soluble solvent used in a manufacturing process tends to remain in particles due to a thick shell.

Since the hollow resin particles disclosed in Patent Literature 2 have a small ratio of crosslinkable monomer units contained in the shell, there is a problem that the strength of the shell is low.

Since the hollow resin particles disclosed in Patent Literature 3 have fine through holes, when an attempt is made to prepare a molded body using a resin composition containing the hollow resin particles, the resin penetrates into the inside from the through hole of the hollow resin particles at the time of molding, and it is difficult to maintain the voids of the hollow resin particles, so that the molded body is hardly reduced in weight.

An object of the present disclosure is to provide hollow particles which have a high void ratio, hardly collapse, and have a reduced amount of volatile compounds, a resin composition containing the hollow particles and a resin, and a molded body of the resin composition.

Solution to Problem

The present inventor has noticed that the balance of the composition of the shell of the hollow particles, an appropriate void ratio of the hollow particles, and the thickness of the shell are important, in order to make the hollow particles difficult to collapse and to reduce the amount of volatile compounds in the hollow particles.

The present disclosure provides hollow resin particles comprising a shell and a hollow portion surrounded by the shell, and having a void ratio of 50% or more and 90% or less, wherein the shell has a thickness of 0.2 µm or more and 0.9 µm or less, and the shell contains a polymer derived from a polymerizable monomer for shell, which is composed of 70% by mass or more and 100% by mass or less of a crosslinkable monomer and 0% by mass or more and 30% by mass or less of a non-crosslinkable monomer, and a polar resin selected from the group consisting of polymers containing a repeating unit which contains a hetero atom.

In the hollow particles of the present disclosure, it is preferable that a content of the polar resin is 0.1 parts by mass or more and 10.0 parts by mass or less per 100 parts by mass of the polymerizable monomer for shell.

In the hollow particles of the present disclosure, it is preferable that the polar resin is an acrylic resin.

In the hollow particles of the present disclosure, it is preferable that the acrylic resin as the polar resin is a copolymer derived from polymerizable monomers for polar resin, wherein the polymerizable monomers for polar resin comprise 50.0% by mass or more and 99.9% by mass or less of a methyl methacrylate and 0.1% by mass or more and 5.0% by mass or less of a polar group-containing monomer containing at least one polar group selected from a carboxyl group, a hydroxyl group, a sulfonic acid group, an amino group, a polyoxyethylene group and an epoxy group.

The present disclosure provides a resin composition comprising the hollow particles of the present disclosure, and a resin.

In addition, the present disclosure provides a molded body of the resin composition of the present disclosure.

Advantageous Effects of Invention

According to the present disclosure as described above, it is possible to provide hollow particles which have a high void ratio, hardly collapse, and have a reduced amount of volatile compounds, a resin composition containing the hollow particles and a resin, and a molded body of the resin composition.

DESCRIPTION OF EMBODIMENTS

I. Hollow Particles

Hollow particles of the present disclosure are particles each comprising a shell containing a resin (outer shell) and a hollow portion surrounded by the shell.

In the present disclosure, a hollow portion is a hollow space that is clearly distinguished from a shell of a hollow particle, which is formed of a resin material. The shell of the hollow particle may have a porous structure, but in that case, the hollow portion has a size which can be clearly distinguished from many minute spaces uniformly dispersed within the porous structure.

For example, the hollow portion of the hollow particle can be confirmed, by SEM observation of the particle cross section or by TEM observation of the particle as it is.

The hollow portion possessed by the hollow particle may be filled with a gas such as air, or may contain a solvent.

The hollow particles of the present disclosure usually have no communication holes or shell defects in the shell, and the hollow portion is isolated from the outside of the particle by the shell. Generally, hollow particles include those in which the shell does not have a communicating hole through the hollow portion and the external space of the particle, and those in which the shell has one or two or more communicating holes, and the hollow portion communicates with the outside of the particle through the communicating hole. While the communicating hole may provide a beneficial function to the hollow particle, the communicating hole is a portion in which the shell is missing, and thus causes the hollow particle to tend to collapse by decreasing its strength. The hollow particles of the present disclosure usually do not have a communication hole having a diameter of 10 nm or more and 500 nm or less. In the present disclosure, the shell defect of the hollow particle means a crack-shaped defect which is extremely large for the size of the particle, and causes deterioration of the strength of the hollow particle. Although depending on the size of the hollow particles, a crack having a length of 1 µm or more is generally recognized as a shell defect because it remarkably deteriorates the strength of the hollow particle.

In the present disclosure, a shell not having a communication hole or a shell defect may be a shell not substantially having a communication hole or a shell defect. When 100 hollow particles are observed by SEM and a number of hollow particles having a communication hole or a shell defect is 5 or less, the shell of the produced hollow particles can be regarded as a shell not having a communication hole or a shell defect.

The hollow particles of the present disclosure include a shell and a hollow portion surrounded by the shell, and have a void ratio of 50% or more and 90% or less, wherein the shell has a thickness of 0.2 µm or more and 0.9 µm or less, and the shell contains a polymer derived from a polymerizable monomer for shell, which is composed of 70% by mass or more and 100% by mass or less of a crosslinkable monomer and 0% by mass or more and 30% by mass or less of a non-crosslinkable monomer, and a polar resin selected from the group consisting of polymers containing a repeating unit which contains a hetero atom.

For example, the hollow particles of the present disclosure are produced by a suspension polymerization method in which a mixture liquid containing a crosslinkable monomer of the above specific amount, a non-crosslinkable monomer which may be added in the above specific amount, a polar resin which has been polymerized in advance, an oil-soluble polymerization initiator, and a hydrocarbon solvent, is dispersed in an aqueous medium, and then polymerized. In the hollow particles of the present disclosure, a polymer obtained by polymerizing a polymerizable monomer for shell composed of a crosslinkable monomer of the above specific amount and a non-crosslinkable monomer which may be added at the above specific amount, forms a skeleton of a shell. A polar resin which is polymerized in advance and then added is usually adhered to the surface of the polymer. When the hollow particles of the present disclosure are produced by the above suspension polymerization method, a polymerization reaction proceeds in a condition in which droplets containing a crosslinkable monomer, a polar resin, and the like are dispersed in an aqueous medium. The polar resin in the liquid droplets has a relatively high affinity for an aqueous medium and tends to migrate to an interface with an aqueous medium. Therefore, it is presumed that the hollow particles of the present disclosure obtained after the polymerization reaction tend to have a polar resin disposed on an outer surface of the shell.

In the hollow particles of the present disclosure, the content of the crosslinkable monomer unit occupying the shell of the hollow particles is sufficiently large, because the proportion of the crosslinkable monomer unit is 70% by mass or more in the polymer derived from the polymerizable monomer for shell, which forms a shell. Consequently, the covalent network is densely stretched in the shell, and as a result, the shell is excellent in strength, hardly collapsed, and hardly deformed even against heat or the like imparted from the outside.

Further, in the hollow particles of the present disclosure, the thickness of the shell tends to be 0.2 μm or more and 0.9 μm or less, since the shell contains a polar resin. Hollow particles of the present disclosure are typically obtained by a method using an inorganic dispersant in a suspension step (granulating step). In the suspension step, the presence of heteroatoms of the polar resin on the droplet surface improves the affinity between the droplet and the inorganic dispersant, and the inorganic dispersant tends to coat the droplet, and as a result, the droplet has an appropriate particle size. In addition, by adjusting the amount of the hydrocarbon solvent contained in the droplet so that the void ratio becomes 50% or more and 90% or less, it is estimated that the thickness of the shell of the hollow particles becomes 0.2 μm or more and 0.9 μm or less. Also, the hollow particles of the present disclosure obtained by such a method usually have no communication holes or shell defects in the shell.

The hollow particles of the present disclosure have a high void ratio of 50% or more and 90% or less, and thus are excellent in lightness. In addition, the hollow particles of the present disclosure have a shell excellent in strength, since the shell has a skeleton excellent in strength, the thickness of the shell is 0.2 μm or more and 0.9 μm or less, which is appropriate, and the shell preferably does not have a communication hole or a shell defect. Therefore, the hollow particles of the present disclosure can achieve both light weight and strength and are hardly collapsed even when kneaded with other materials such as resin or when molding after kneading with a resin or the like, so that they can be used as a weight reducing material.

Further, the hollow particles of the present disclosure have a void ratio of 50% or more and 90% or less and a moderately thin thickness of a shell of 0.2 μm or more and 0.9 μm or less, and volatile compounds such as a sparingly water-soluble solvent and an unreacted polymerizable monomer in the particles are easily removed during the manufacturing process, so that the amount of volatile compounds is easily reduced. Since the hollow particles of the present disclosure have reduced amount of volatile compounds, when the resin composition containing hollow particles of the present disclosure is kneaded, there is no fear of foaming and ignition due to volatile compounds in the hollow particles. In addition, since the specific gravity of the hollow particles of the present disclosure is lighter than that of the hollow particles having a large content of the volatile compounds, the efficiency of the weight reduction is excellent.

In the present disclosure, volatile compounds are compounds volatilized when a resin composition containing the hollow particles of the present disclosure is kneaded, and is typically compounds volatilized when a resin composition containing the hollow particles of the present disclosure is melt-kneaded. The volatile compounds are usually compounds having a boiling point of 235° C. or less and a molecular weight of 200 or less. The volatile compounds contained in hollow particles are typically a hydrocarbon solvent used in the production of hollow particles and an unreacted polymerizable monomer remained in the particles.

Hereinafter, materials, physical properties and applications of hollow particles of the present disclosure and a method for producing hollow particles of the present disclosure will be described in detail.

(1) A Polymer Derived from Polymerizable Monomer for Shell

The shell of the hollow particles of the present disclosure contains a polymer derived from a polymerizable monomer for shell composed of 70% by mass or more and 100% by mass or less of a crosslinkable monomer and 0% by mass or more and 30% by mass or less of a non-crosslinkable monomer. Here, a polymer derived from a polymerizable monomer for shell is a polymer obtained by polymerizing a polymerizable monomer for shell, and forms a skeleton of a shell of a hollow particle of the present disclosure.

In addition, in the present disclosure, a polymerizable monomer is a compound having a polymerizable functional group. The non-crosslinkable monomer is a polymerizable monomer having only one polymerizable functional group, and the crosslinkable monomer is a polymerizable monomer having two or more polymerizable functional groups and capable of forming a crosslinking bond in the resin by a polymerization reaction. As the polymerizable monomer, a compound having an ethylenically unsaturated bond as a polymerizable functional group is generally used.

[Crosslinkable Monomer]

Since the crosslinkable monomer has a plurality of polymerizable functional groups, it can link monomers to each other, and it can increase the strength and heat resistance of the shell.

Examples of the crosslinkable monomer include bifunctional crosslinkable monomers such as divinylbenzene, divinyldiphenyl, divinylnaphthalene, diallyl phthalate, allyl (meth)acrylate, ethylene glycol di(meth)acrylate, and pentaerythritol di(meth)acrylate; and tri- or higher functional crosslinkable monomers such as trimethylolpropane tri(meth)acrylate, ditrimethylolpropane tetra(meth)acrylate, pentaerythritol tri(meth)acrylate, pentaerythritol tetra(meth)acrylate, and dipentaerythritol hexa(meth)acrylate. Of these, divinylbenzene, ethylene glycol di(meth)acrylate and pentaerythritol di(meth)acrylate are preferred, and ethylene glycol di(meth)acrylate and pentaerythritol di(meth)acrylate are more preferred.

Each of these crosslinkable monomers may be used alone or in combination of two or more thereof.

In the present disclosure, (meth)acrylic means each of acrylate and methacrylate, and (meth)acryl means each of acryl and methacryl.

[Non-Crosslinkable Monomer]

As a non-crosslinkable monomer, a monovinyl monomer is preferably used. A monovinyl monomer is a compound having one polymerizable vinyl functional group. Examples of the monovinyl monomer include (meth)acrylic monovinyl monomers such as methyl (meth)acrylate, ethyl (meth)acrylate, butyl (meth)acrylate, 2-ethylhexyl (meth)acrylate, lauryl (meth)acrylate, glycidyl (meth)acrylate, 2-hydroxyethyl (meth)acrylate; aromatic vinyl monomers such as styrene, vinyl toluene, α-methyl styrene, p-methyl styrene, halogenated styrene; monoolefin monomers such as ethylene, propylene, butylene; (meth)acrylamide monomers such as (meth)acrylamide, N-methylol (meth)acrylamide, N-butoxymethyl (meth)acrylamide, and derivatives thereof; diene monomers such as butadiene and isoprene; carboxylic acid vinyl ester monomers such as vinyl acetate; vinyl halide monomers such as vinyl chloride; and vinylidene halide monomers such as vinylidene chloride; and vinylpyridine monomers; and the like. Among the monovinyl monomer, (meth)acrylic monovinyl monomers are preferred from the viewpoint of reactivity, and at least one selected from butyl acrylate and methyl methacrylate is more preferred.

Each of these non-crosslinkable monomers may be used alone or in combination of two or more thereof.

In the present disclosure, the content ratio of the crosslinkable monomer and the non-crosslinkable monomer per 100% by mass of the polymerizable monomer for shell is as follows: the crosslinkable monomer is 70% by mass or more and 100% by mass or less, and the non-crosslinkable monomer is 0% by mass or more and 30% by mass or less. Since the content of the crosslinkable monomer is 70% by mass or more, the covalent network is densely stretched in the shell because the content of the crosslinkable monomer unit occupying the shell of the hollow particles is sufficiently large. Consequently, the hollow particles are excellent in strength, hardly collapsed, and difficult to deform even against heat or the like imparted from the outside. On the other hand, since the non-crosslinkable monomer is contained in a ratio of 30% by mass or less, the occurrence of the communication hole and the shell defect of the shell is more likely to be further suppressed. When the polymerizable monomer for shell contains the non-crosslinkable monomer, the content of the crosslinkable monomer and the non-crosslinkable monomer per 100% by mass of the polymerizable monomer for shell, is not particularly limited, but for example, the content of the crosslinkable monomer may be 70% by mass or more and 95% by mass or less and the content of the non-crosslinkable monomer may be 5% by mass or more and 30% by mass or less, and the content of the crosslinkable monomer may be 70% by mass or more and 90% by mass or less and the content of the non-crosslinkable monomer may be 10% by mass or more and 30% by mass or less.

(2) Polar Resin

The shell of the hollow particles of the present disclosure further comprises a polar resin.

In the present disclosure, the polar resin is selected from the group consisting of polymers containing a repeating unit which contains a hetero atom. Examples of the polar resin include an acrylic resin, a polyester-based resin, and a vinyl-based resin containing a hetero atom.

The polar resin may be a homopolymer or a copolymer of a heteroatom-containing monomer or a copolymer of a heteroatom-containing monomer and a heteroatom-free monomer. When the polar resin is a copolymer of a heteroatom-containing monomer and a heteroatom-free monomer, the proportion of the heteroatom-containing monomer unit is preferably 50% by mass or more, more preferably 70% by mass or more, and still more preferably 90% by mass or more, per 100% by mass of all repeating units constituting the copolymer, from the viewpoint of easily controlling the particle diameter of the hollow particles and the thickness of the shell.

Examples of the heteroatom-containing monomer for a polar resin include monomers containing an (meth)acryloyl group, that is (meth)acrylic monovinyl monomers, such as methyl (meth)acrylate, ethyl (meth)acrylate, butyl (meth)acrylate, 2-ethylhexyl (meth)acrylate, lauryl (meth)acrylate, acrylic acid, methacrylic acid, 2-hydroxyethyl (meth)acrylate, 2-hydroxypropyl (meth)acrylate, 4-hydroxybutyl (meth)acrylate, methoxypolyethylene glycol (meth)acrylate, (dimethylamino)ethyl (meth)acrylate, (diethylamino)ethyl (meth)acrylate, glycidyl (meth)acrylate, and 4-hydroxybutyl acrylate glycidyl ether; aromatic vinyl monomers containing a heteroatom such as halogenated styrene and styrene sulfonic acids; carboxylic acid vinyl ester monomers such as vinyl acetate; vinyl halide monomers such as vinyl chloride; vinylidene halide monomers such as vinylidene chloride; vinylpyridine monomers; carboxyl group containing monomers such as ethylenically unsaturated carboxylic acid monomers such as crotonic acid, cinnamic acid, itaconic acid, fumaric acid, maleic acid, and butenetricarboxylic acid; and epoxy group containing monomers such as allyl glycidyl ether. Each of these heteroatom-containing monomers may be used alone or in combination of two or more thereof.

Examples of the heteroatom-free monomer for the polar resin include aromatic vinyl monomers containing no hetero atom such as styrene, vinyltoluene, α-methylstyrene, and p-methylstyrene; monoolefin monomers such as ethylene, propylene, and butylene; and diene-based monomers such as butadiene and isoprene. Each of these heteroatom-free monomers may be used alone or in combination of two or more thereof.

Among them, the polar resin is preferably an acrylic resin in which the total mass of the (meth)acrylic monovinyl monomer unit is preferably 50% by mass or more, more preferably 70% by mass or more, and still more preferably 90% by mass or more, with respect to 100% by mass of all repeating units constituting the resin, from the viewpoint of high compatibility with the polymerizable monomer for shell and easy control of the particle diameter of the hollow particles and the thickness of the shell. An acrylic resin in which all repeating units constituting the resin are composed of (meth)acrylic monovinyl monomer units is particularly preferable.

In the polar resins, from the viewpoint of easy control of the particle diameter of the hollow particles and the thickness of the shell, the heteroatom-containing monomer unit preferably contains a polar group-containing monomer unit containing at least one polar group selected from a carboxyl group, a hydroxyl group, a sulfonic acid group, an amino group, a polyoxyethylene group and an epoxy group. As the polar group, at least one kind selected from a carboxyl group and a hydroxyl group is preferred since the particle diameter can be controlled with a small addition amount.

Examples of the polar group-containing monomer include carboxyl group-containing monomers such as ethylenically unsaturated carboxylic acid monomers such as acrylic acid, methacrylic acid, crotonic acid, cinnamic acid, itaconic acid, fumaric acid, maleic acid, and butenetricarboxylic acid; hydroxyl group-containing monomers such as 2-hydroxyethyl (meth)acrylate, 2-hydroxypropyl (meth)acrylate, and 4-hydroxybutyl (meth)acrylate; sulfonic acid group-containing monomers such as styrene sulfonic acid; amino group-containing monomers such as (dimethylamino)ethyl (meth)acrylate, (diethylamino)ethyl (meth)acrylate; polyoxyethylene group-containing monomers such as methoxy polyethylene glycol (meth)acrylate; epoxy group-containing monomers such as glycidyl (meth)acrylate, allyl glycidyl ether, 4-hydroxybutylacrylate glycidyl ether. Each of these polar group-containing monomers may be used alone or in combination of two or more thereof.

When the polar resin contains a polar group-containing monomer unit, it is preferable that the polar group is located at the terminal of a main chain or a side chain or is pendant-like bonded to a main chain or a side chain in view of easy placement of the polar resin on the outer surface of the hollow particles and easy control of the particle diameter of the hollow particles and the thickness of the shell.

When the polar resin does not contain the polar group-containing monomer unit, the heteroatom-containing monomer unit contained in the polar resin preferably includes a monomer unit derived from an alkyl (meth)acrylate, and more preferably includes a monomer unit derived from an alkyl (meth)acrylate in which the number of carbon atoms of the alkyl group is preferably 3 or less, more preferably the alkyl group is a methyl group or an ethyl group, and still more preferably the alkyl group is a methyl group due to their high polarity, because the monomer units have high compatibility with the polymerizable monomer for shell, and the particle diameter and the thickness of the shell of the hollow particles can be easily controlled.

As the acrylic resin which is a polar resin, it is preferable to be a polymer or a copolymer derived from a polymerizable monomer for polar resin containing 50.0% by mass or more of methyl methacrylate when the total mass of the polymerizable monomer for polar resin is set to 100% by mass, from the viewpoint of high compatibility with the polymerizable monomer for shell and easy control of the particle diameter of the hollow particles and the thickness of the shell. In the present disclosure, a polymerizable monomer used for synthesizing a polar resin is referred to as a polymerizable monomer for polar resin.

As the acrylic resin which is a polar resin, it is more preferable to be a copolymer of polymerizable monomers for polar resin containing 50.0% by mass or more and 99.9% by mass or less of methyl methacrylate and 0.1% by mass or more and 5.0% by mass or less of a polar group-containing monomer; it is still more preferable to be a copolymer of polymerizable monomers for polar resin containing 50.0% by mass or more and 99.0% by mass or less of methyl methacrylate and 0.1% by mass or more and 5.0% by mass or less of a polar group-containing monomer; it is even more preferable to be a copolymer of polymerizable monomers for polar resin containing 50.0% by mass or more and 98.0% by mass or less of methyl methacrylate, 1.0% by mass or more and 5.0% by mass or less of a (meth)acrylic monomer which is different from methyl methacrylate and contains no polar group, and 0.1% by mass or more and 5.0% by mass or less of a polar group-containing monomer; and it is particularly preferable to be a copolymer of polymerizable monomers for polar resin containing 50.0% by mass or more and 98.0% by mass or less of methyl methacrylate, 1.0% by mass or more and 5.0% by mass or less of a (meth)acrylic monovinyl monomer which is different from methyl methacrylate and contains no polar group, and 0.2% by mass or more and 3.0% by mass or less of a polar group-containing monomer.

As the (meth)acrylic monovinyl monomer which is different from methyl methacrylate and contains no polar group, at least one selected from ethyl acrylate and butyl acrylate is preferred from the viewpoint of controlling the glass transition point, and ethyl acrylate is particularly preferred.

As the polar group-containing monomer, a (meth)acrylic monovinyl monomer containing the polar group is preferable from the viewpoint of compatibility with the polymerizable monomer for shell, and a (meth)acrylic monovinyl monomer containing a carboxyl group or a hydroxyl group is more preferred from the viewpoint of being capable of controlling the particle diameter with a further small addition amount.

For example, the polar resin can be obtained by polymerizing a polymerizable monomer for polar resin containing a heteroatom-containing monomer by a polymerization method such as solution polymerization or emulsion polymerization.

When the polar resin is a copolymer, the copolymer may be any of a random copolymer, a block copolymer, or a graft copolymer, but is preferably a random copolymer.

It is preferable that the polar resin is finer pulverized from the viewpoint of improving solubility.

The number average molecular weight (Mn) of the polar resin is not particularly limited, but is preferably within a range of 3000 or more and 20000 or less, more preferably within a range of 4000 or more and 17000 or less, and still more preferably within a range of 6000 or more and 15000 or less, in terms of polystyrene measured by gel permeation chromatography (GPC) using tetrahydrofuran. When the number average molecular weight (Mn) of the polar resin is equal to or higher than the above lower limit value, solubility of the polar resin is improved, and control of the particle diameter of the hollow particles and the thickness of the shell is easy, and when the number average molecular weight (Mn) is equal to or lower than the above upper limit value, reduction in strength of the shell can be suppressed.

In the hollow particles of the present disclosure, the content of the polar resin is preferably 0.1 parts by mass or more and 10.0 parts by mass or less, more preferably 0.3 parts by mass or more and 8.0 parts by mass or less, and still more preferably 0.5 parts by mass or more and 8.0 parts by mass or less, per 100 parts by mass of the polymerizable monomer for shell. When the content of the polar resin is equal to or higher than the above lower limit, the particle diameter of the hollow particles and the thickness of the shell can be easily controlled, so that the strength of the hollow particles can be improved and the content of the volatile compounds can be reduced. On the other hand, when the content of the polar resin is equal to or lower than the above upper limit value, the decrease in the content ratio of the polymer derived from the polymerizable monomer for shell can be suppressed, so that the decrease in the strength of the shell can be suppressed and the collapse of the hollow particles can be further suppressed.

(3) Physical Properties of Hollow Particles

The hollow particles of the present disclosure have a void ratio of 50% or more and 90% or less, preferably 50% or more and 85% or less, and more preferably 60% or more and 80% or less. When the void ratio is equal to or higher than the above lower limit, the hollow particles are excellent in light weight, heat resistance and heat insulating property, and the sparingly water-soluble solvent used in the polymerization step hardly remains inside the particles. When the void ratio is equal to or less than the above upper limit value, the hollow particles are difficult to collapse and have excellent strength.

For example, when hollow particles are produced by the suspension polymerization method described later, the void ratio of the hollow particles can be adjusted by the amount of the hydrocarbon solvent in the mixture liquid. In the suspension polymerization method described later, the larger the content of the hydrocarbon solvent, the higher the void ratio of the obtained hollow particles tends to be, because the polymerization reaction proceeds in a condition in which an oil droplet containing a crosslinkable monomer or the like includes a hydrocarbon solvent.

The void ratio of the hollow particles of the present disclosure is calculated from the apparent density $D_1$ and the true density $D_0$ of the hollow particles.

The method for measuring the apparent density $D_1$ of hollow particles are as follows. First, approximately 30 cm$^3$ of hollow particles are introduced in a 100 cm$^3$ volumetric flasks, and the mass of the introduced hollow particles is precisely weighed. Next, the volumetric flask, in which the hollow particles are introduced, is precisely filled with isopropanol to the target line, taking care not to allow air bubbles to enter. The mass of isopropanol added to the volumetric flask is precisely weighed, and the apparent density $D_1$ (g/cm$^3$) of the hollow particles is calculated on the basis of the following formula (I).

$$\text{Apparent density } D_1=[\text{Mass of hollow particles}]/(100-[\text{Mass of isopropanol}]/[\text{Specific gravity of isopropanol at measured temperature}]) \quad \text{Formula (I)}$$

The apparent density $D_1$ corresponds to the specific gravity of the entire hollow particle when the hollow portion is regarded as a part of the hollow particle.

The procedure for measuring the true density $D_0$ of hollow particles is as follows. After the hollow particles are pulverized in advance, approximately 10 g of pulverized pieces of the hollow particles are introduced in a 100 cm$^3$ volumetric flasks, and the mass of the introduced pulverized pieces is precisely weighed. Thereafter, isopropanol is added to the volumetric flask in the same manner as the above-mentioned measurement of the apparent density, and the mass of the isopropanol is precisely weighed, and the true density $D_0$ of the hollow particles (g/cm$^3$) is calculated on the basis of the following formula (II).

$$\text{True density } D_0=[\text{Mass of pulverized pieces of hollow particle}]/(100-[\text{Mass of isopropanol}]/[\text{Specific gravity of isopropanol at measured temperature}]) \quad \text{Formula (II)}$$

The true density $D_0$ corresponds to the specific gravity of only the shell part of the hollow particle. As is obvious from the above measuring method, the hollow portion is not regarded as a part of the hollow particles in the calculation of the true density $D_0$.

The void ratio (%) of the hollow particles is calculated from the apparent density $D_1$ and the true density $D_0$ of the hollow particles by the following formula (III).

$$\text{Void rate (\%)}=100-(\text{Apparent density } D_1/\text{True density } D_0)\times 100 \quad \text{Formula (III)}$$

The void ratio of the hollow particles can be reworded as the ratio of the hollow portion in the specific gravity of the hollow particles.

The lower limit of the volume average particle diameter (Dv) of the hollow particles of the present disclosure is preferably 4.0 μm or more, more preferably 4.5 μm or more, and still more preferably 5.0 μm or more. On the other hand, the upper limit of the volume average particle diameter (Dv) of the hollow particles of the present disclosure is preferably 25.0 μm or less, more preferably 13.0 μm or less, still more preferably 12.0 μm or less, and particularly preferably 10.0 μm or less.

When the volume average particle diameter of the hollow particles is equal to or larger than the above lower limit value, excellent dispersibility can be exhibited, since the cohesiveness between the hollow particles becomes small. When the volume average particle diameter of the hollow particles is equal to or smaller than the above upper limit value, the mechanical strength is improved.

The particle size distribution (volume average particle diameter (Dv)/number average particle diameter (Dn)) of the hollow particles may be, for example, 1.1 or more and 2.5 or less. When the particle size distribution is 2.5 or less, particles having little variation in compressive strength characteristics and heat resistance among the particles can be obtained. In addition, when the particle size distribution is 2.5 or less, a product having a uniform thickness can be manufactured in the case that a sheet-like molded body is manufactured.

An example of the method to determine the volume average particle diameter (Dv) and the number average particle diameter (Dn) of the hollow particles as follows: measuring the particle size of the hollow particles by a laser diffraction particle size distribution measuring apparatus, calculating the number average and the volume average thereof respectively, and the obtained value can be the number average particle size (Dn) and the volume average particle size (Dv) of the particles. The particle size distribution is a value obtained by dividing the volume average particle diameter by the number average particle diameter.

The hollow particles of the present disclosure may have an average circularity of 0.950 or more and 0.995 or less.

For example, the shape of the hollow particles can be confirmed by SEM or TEM. The shape of the inside of the hollow particle can be confirmed by SEM or TEM after cutting the particle into round slices by a known method.

The hollow particles of the present disclosure have a shell thickness of 0.2 μm or more and 0.9 μm or less, preferably 0.2 μm or more and 0.8 μm or less, more preferably 0.25 μm or more and 0.7 μm or less, still more preferably 0.25 μm or more and 0.6 μm or less, and even more preferably 0.25 μm or more and 0.5 μm or less.

The thickness of the shell of the hollow particles can be calculated as follows: calculating an inner diameter r by the following formula (1) using the volume average particle diameter R and the void ratio of the hollow particles, and using the inner diameter r and the volume average particle diameter R, the thickness of the shell of the hollow particles is calculated by the following formula (2).

$$4/3\pi\times(R/2)^3\times\text{Void ratio}=4/3\pi\times(r/2)^3 \quad \text{Formula (1)}$$

$$\text{Shell thickness}=(R-r)/2 \quad \text{Formula (2)}$$

Since the difference between the thickness of the shell thus calculated and the average value of the thickness at 20 points of the shell to be actually measured is usually within ±10% of the average value of them, the thickness of the shell calculated as described above can be considered as the thickness of the shell of the hollow particle.

The thickness at each point of the shell of the hollow particles used in determining the average value of the thickness at 20 points of the shell can be measured, for example, by dividing the hollow particles in order to obtain a piece of the shell and observing the piece with SEM.

In the hollow particles of the present disclosure, the amount of volatile compounds is preferably 0.5% by mass or less, more preferably 0.3% by mass or less, and still more preferably 0.2% by mass or less, with respect to 100% by mass of the total mass of the hollow particles. When the amount of volatile compounds in the hollow particles is equal to or lower than the above upper limit value, there is no fear that the volatile compounds in the hollow particles volatilizes and foams, or causes ignition, when the hollow particles of the present disclosure are kneaded with other materials, and the specific gravity of the hollow particles can be reduced, so that the effect of the hollow particles as a weight reducing material can be improved.

A method of measuring the amount of volatile compounds in the hollow particles is as follows.

First, approximately 100 mg of hollow particles are put into a 30 mL screw cap glass bottle, and are precisely weighed. Subsequently, approximately 10 g of tetrahydrofuran (THF) is put in, and is precisely weighed. The mixture in the glass bottle is stirred for 1 hour with a stirrer, and volatile compounds contained in the hollow resin particles are extracted. The stirring is stopped, and the resin component of the hollow particles insoluble in THF is precipitated, and then a sample liquid is obtained by filtering the precipitate. The sample liquid is analyzed by gas chromatography (GC), and the amount of volatile compounds per unit mass (% by mass) contained in the hollow particles is determined from the peak area of GC and a calibration curve prepared in advance. Detailed analysis conditions are as follows.

(Analysis Conditions)

Apparatus: GC-2010 (manufactured by Shimadzu Corporation)
Column: DB-5 (manufactured by Agilent Technologies Japan, Ltd.)
Film thickness: 0.25 μm, Inner diameter: 0.25 mm, Length: 30 m
Detector: FID
Carrier gas: Nitrogen (linear velocity: 28.8 cm/sec)
Injection port temperature: 200° C.
Detector temperature: 250° C.
Oven temperature: Raised from 40° C. to 230° C. at a rate of 10° C./min, and held at 230° C. for 2 minutes
Sampling volume: 2 μL (4) Applications The hollow particles of the present disclosure are particularly preferable as an additive for a molded body because they are difficult to collapse at the time of kneading with another material and at the time of molding after kneading, and are excellent in effect as a weight reducing material, a heat insulating material, a sound insulating material, a vibration damping material, and the like when added to a molded body. Since the hollow particles of the present disclosure are difficult to collapse even at the time of kneading with the resin and at the time of molding after the kneading, the hollow particles of the present disclosure are particularly preferable as an additive for a resin molded body. Examples of the resin molded body containing the hollow particles of the present disclosure include materials such as a light reflecting material, a heat insulating material, a sound insulating material, and low dielectric materials used in various fields such as automobiles, electricity, electronics, construction, aeronautics, and space, and a food container.

The hollow particles of the present disclosure have a high void ratio, hardly collapse, and are excellent in heat resistance, so that they satisfy heat insulating properties and cushioning properties required for an under-coating material, and satisfy heat resistance suitable for use in thermal paper. In addition, the hollow particles of the present disclosure are also useful as plastic pigments excellent in gloss, hiding power, and the like.

Further, since the hollow particles of the present disclosure are obtained by enclosing a useful component such as a perfume, a chemical, an agricultural chemical, an ink component, or the like inside by a means such as an immersion treatment, or an immersion treatment under reduced pressure or under pressure, they can be utilized in various applications depending on the component contained inside.

(5) Method for Producing Hollow Particles

It is not particularly limited as long as the hollow particles of the present disclosure described above can be produced. Hereinafter, an embodiment of a method for producing hollow particles will be described, but the method for producing hollow particles of the present disclosure is not necessarily limited to only the following embodiment.

One embodiment of the method for producing hollow particles of the present disclosure includes:

a mixture liquid preparation step of preparing a mixture liquid containing a polymerizable monomer for shell, a polar resin, a hydrocarbon solvent, a dispersant, and an aqueous medium, a suspension step of preparing a suspension in which droplets of a monomer composition containing a hydrocarbon solvent (may be referred to as polymerizable monomer droplets in the present disclosure) are dispersed in an aqueous medium, by suspending the mixture, and a polymerization step of subjecting the suspension to a polymerization reaction.

The method for producing hollow particles may further include a solvent removal step of removing the hydrocarbon solvent contained in the particles after the polymerization step.

In the present disclosure, a hollow particle including a hydrocarbon solvent obtained by the polymerization step may be referred to as a precursor particle, considering that the hollow particle is an intermediate of the hollow particle of the present disclosure. In the present disclosure, a composition containing the precursor particle is referred to as a precursor composition.

Hereinafter, the above-mentioned four steps and other steps will be described in order.

(A) Mixture Liquid Preparation Step

This step includes preparing a mixture liquid containing a polymerizable monomer for shell, a polar resin, a hydrocarbon solvent, a dispersant and an aqueous medium.

In this step, usually, an oil phase containing a polymerizable monomer for shell, a polar resin and a hydrocarbon solvent, and an aqueous phase containing a dispersant and an aqueous medium are prepared separately in advance, and these are mixed to prepare a mixture liquid, so that hollow particles having a uniform composition of the shell portion can be produced.

In addition, the oil phase used for preparing the mixture liquid usually further contains an oil-soluble polymerization initiator as a polymerization initiator.

The polymerizable monomer for shell and the polar resin to be contained in the mixture liquid obtained in the mixture liquid preparation step are as described above.

Although there is no particular limitation on the content of the polymerizable monomer for shell in the mixture liquid, the total amount of the content of the polymerizable monomer for shell is preferably 15 parts by mass or more and 55 parts by mass or less, and more preferably 25 parts by mass or more and 40 parts by mass or less, per 100 parts by mass of the total mass of the components in the mixture liquid excluding the aqueous medium, from the viewpoint of the balance of the void ratio of the hollow particles, the particle diameter and the mechanical strength, and reducing the residual amount of the hydrocarbon solvent.

[Hydrocarbon Solvent]

In the production method, a hydrocarbon solvent is used as a non-polymerizable and sparingly water-soluble organic solvent.

The hydrocarbon solvent has a function of forming a hollow portion inside the particle. In a suspension step described later, a suspension in which polymerizable monomer droplets including a hydrocarbon solvent are dispersed in an aqueous medium is obtained. In the suspension step, as a result of phase separation occurring in the polymerizable monomer droplet, a hydrocarbon solvent having low polarity tends to collect inside the polymerizable monomer droplet. Finally, in the polymerizable monomer droplet, a hydrocarbon solvent is distributed in the interior thereof, and other materials other than the hydrocarbon solvent are distributed at the periphery thereof according to their respective polarities. Then, in a polymerization step described later, a precursor composition containing precursor particles including a hydrocarbon solvent is obtained. In other words, since the hydrocarbon solvent collects inside the particles, a hollow portion filled with a hydrocarbon solvent is formed inside the obtained precursor particles.

In the hydrocarbon solvent used in the production method of the present disclosure, the content of the saturated hydrocarbon solvent is preferably 50% by mass or more per a total amount of 100% by mass of the hydrocarbon solvent. Because of this, hollow particles having only one hollow portion are easily obtained, and generation of porous particles can be suppressed, since phase separation is sufficiently generated in the polymerizable monomer droplets. The ratio of the saturated hydrocarbon solvent is preferably 60% by mass or more, and more preferably 80% by mass or more, since the formation of porous particles are further suppressed, and the hollow portion of each hollow particle tends to be uniform.

Examples of the saturated hydrocarbon solvent contained in the hydrocarbon solvent include butane, pentane, normal hexane, cyclohexane, heptane, and octane.

As a solvent other than the saturated hydrocarbon solvent contained in the hydrocarbon solvent, aromatic hydrocarbon solvents such as benzene, toluene, xylene, or the like can be preferably used.

In addition, as the hydrocarbon solvent, a hydrocarbon solvent having 4 or more and 7 or less carbon atoms is preferred. A hydrocarbon compound having 4 or more and 7 or less carbon atoms is easily included in the precursor particles during the polymerization step, and can be easily removed from the precursor particles during the solvent removal step. Among them, a hydrocarbon solvent having 5 or 6 carbon atoms is particularly preferred.

Although there is no particular limitation, from the point of easy removal of the hydrocarbon solvent in the solvent removal step described later, a solvent having a boiling point of 130° C. or less is preferred, and a solvent having a boiling point of 100° C. or less is more preferred, as the hydrocarbon solvent. In addition, a solvent having a boiling point of 50° C. or more is preferred, and a solvent having a boiling point of 60° C. or more is more preferred as the hydrocarbon solvent, since the hydrocarbon solvent can be easily encapsulated in the precursor particle.

It is preferable that the hydrocarbon solvent has a relative permittivity of 3 or less at 20° C. The relative permittivity is one of indices indicating the height of polarity of a compound. When the relative permittivity of the hydrocarbon solvent is sufficiently small to be 3 or less, it is considered that phase separation proceeds promptly in the polymerizable monomer droplet and hollow is easily formed.

Examples of a solvent having a relative permittivity of 3 or less at 20° C. are as follows. Figures in parentheses are values of relative permittivity.

Heptane (1.9), cyclohexane (2.0), benzene (2.3), toluene (2.4), and octane (1.9).

Regarding the relative permittivity at 20° C., values written in known literatures (e.g., the Chemical Society of Japan, as editor, "Kagaku Binran, Kiso Hen, Kaitei 4 Ban", pp. 11-498 to 11-503, published by Maruzen Publishing Co., Ltd. on Sep. 30, 1993) and other technical information may be used as reference. Examples of the method for measuring the relative permittivity at 20° C. include a relative permittivity test which is in conformity with 23 of JIS C 2101:1999 and which is carried out at a measuring temperature set to 20° C.

In the present disclosure, the content of the hydrocarbon solvent in the mixture liquid is preferably 50 parts by mass or more and 500 parts by mass or less per 100 parts by mass of the total mass of the polymerizable monomer for shell, since the particle diameter of the hollow particles can be easily controlled, the void ratio can be easily increased while maintaining the strength of the hollow particles, and the residual hydrocarbon solvent amount in the particles can be easily reduced. The content of the hydrocarbon solvent in the mixture liquid is preferably 60 parts by mass or more and 400 parts by mass or less, more preferably 70 parts by mass or more and 300 parts by mass or less, and still more preferably 80 parts by mass or more and 200 parts by mass or less, per 100 parts by mass of the total mass of the polymerizable monomer for shell.

[Oil-Soluble Polymerization Initiator]

In the present disclosure, an oil-soluble polymerization initiator is preferably used as a polymerization initiator.

The oil-soluble polymerization initiator is not particularly limited as long as it is a lipophilic one having a solubility in water of 0.2% by mass or less. Examples of the oil-soluble polymerization initiator include benzoyl peroxide, lauroyl peroxide, t-butyl peroxide-2-ethylhexanoate, 2,2'-azobis(2, 4-dimethylvaleronitrile) and azobisisobutyronitrile.

With respect to 100 parts by mass of the total mass of the polymerizable monomer for shell in the mixture liquid, the content of the oil-soluble polymerization initiator is preferably 0.1 parts by mass or more and 10 parts by mass or less, more preferably 0.5 parts by mass or more and 7 parts by mass or less, and still more preferably 1 part by mass or more and 5 parts by mass or less. When the content of the oil-soluble polymerization initiator is within the above range, the polymerization reaction is sufficiently proceeded, and there is a small fear that the oil-soluble polymerization initiator remains after the completion of the polymerization reaction, and there is also a small fear that an unexpected side reaction proceeds.

[Dispersant]

The dispersant contained in the mixture liquid is a dispersant contained in an aqueous phase, and an inorganic dispersant is preferably used. By using an inorganic dispersant, polymerizable monomer droplets having a large particle diameter can be formed in a suspension, the thickness of the shell after polymerization tends to be 0.2 μm or more and 0.9 µm or less, and collapse of the obtained hollow particles tends to be suppressed. Further, the particle size distribution of the hollow particles can be narrowed, and the residual amount of the dispersant after washing can be reduced, by using an inorganic dispersant.

Examples of the inorganic dispersant include inorganic compounds such as sulfates such as barium sulfate and calcium sulfate; carbonates such as barium carbonate, calcium carbonate and magnesium carbonate; phosphates such as calcium phosphate; metal oxides such as aluminum oxide and titanium oxide; metal hydroxides such as aluminum hydroxide, magnesium hydroxide, calcium hydroxide, barium hydroxide and ferric hydroxide. These dispersants may be used alone or in combination of two or more thereof.

Among the above dispersants, sparingly water-soluble inorganic metal salts such as the sulfates, the carbonates, the phosphates and the metal hydroxides described above are preferred, the metal hydroxides are more preferred, and magnesium hydroxide is particularly preferred.

The sparingly water-soluble inorganic metal salt in the present disclosure is preferably an inorganic metal salt having a solubility of 0.5 g or less in 100 g of water.

The content of the dispersant is not particularly limited, but is usually 0.5 parts by mass or more and 10 parts by mass or less, preferably 1 part by mass or more and 8 parts by mass or less, per 100 parts by mass of the total mass of the polymerizable monomer for shell and the hydrocarbon solvent. When the content of the dispersant is within the above range, the thickness of the shell after polymerization tends to be 0.2 µm or more and 0.9 µm or less, and collapse of the obtained hollow particles tends to be suppressed.

[Aqueous Medium]

In the present disclosure, an aqueous medium means a medium selected from the group consisting of water, a hydrophilic solvent, and a mixture of water and a hydrophilic solvent.

The hydrophilic solvent in the present disclosure is not particularly limited as long as it is sufficiently mixed with water and does not cause phase separation. Examples of the hydrophilic solvent include alcohols such as methanol and ethanol; tetrahydrofuran (THF); and dimethyl sulfoxide (DMSO).

Among the aqueous medium, water is preferably used because of its high polarity. When a mixture of water and a hydrophilic solvent is used, it is important that the overall polarity of the mixture does not become too low from the viewpoint of forming polymerizable monomer droplets. In this case, for example, a mixing ratio (mass ratio) of water and a hydrophilic solvent may be set as a water:hydrophilic solvent=99:1 to 50:50.

In the mixture liquid preparation step, a mixture liquid may be obtained by simply mixing each of the above materials and other materials if needed, and appropriately stirring or the like. It is preferable to prepare a mixture liquid by preparing an oil phase containing a polymerizable monomer for shell, a polar resin and a hydrocarbon solvent, and an aqueous phase containing a dispersant and an aqueous medium, separately in advance, and mixing them, because the shell tends to be uniform.

In the mixture liquid obtained in this step, an oil phase containing a lipophilic material such as a polymerizable monomer for shell, a polar resin, an oil-soluble polymerization initiator and a hydrocarbon solvent described above is dispersed in an aqueous phase containing a dispersant, an aqueous medium and the like, in a size of about several millimeters in particle size. The dispersion state of these materials in the mixture liquid can be observed even by the naked eye depending on the type of the materials.

(B) Suspension Step

This step includes preparing a suspension in which polymerizable monomer droplets containing a hydrocarbon solvent are dispersed in an aqueous medium by suspending the above-mentioned mixture liquid.

The suspension method for forming the polymerizable monomer droplets is not particularly limited. For example, the suspension method is carried out using a device capable of strong agitation such as an in-line emulsification disperser (product name: MILDER, manufactured by Pacific Machinery & Engineering Co., Ltd.), a high-speed emulsification disperser (product name: T.K. HOMOMIXER MARK II TYPE, manufactured by PRIMIX Corporation), or the like.

In the suspension prepared in the suspension preparation step, polymerizable monomer droplets including a hydrocarbon solvent are uniformly dispersed in an aqueous medium. The polymerizable monomer droplets are droplets having a diameter of approximately 3.0 µm to 30.0 µm. It is difficult to observe them by the naked eye. They can be observed by a known observation instrument such as an optical microscope, or the like.

In the suspension step, phase separation occurs in the polymerizable monomer droplet, so that a hydrocarbon solvent which has low polarity tends to collect inside the polymerizable monomer droplet. As a result, in the obtained polymerizable monomer droplet, a hydrocarbon solvent is distributed inside and a material other than a hydrocarbon solvent is distributed at its periphery.

In the suspension step, a polymerization initiating radical is generated in the polymerizable monomer droplets by an oil-soluble polymerization initiator after the polymerizable monomer droplets are formed in advance. Therefore, it is possible to produce precursor particles having a target particle size without excessively growing polymerizable monomer droplets.

In addition, in the suspension polymerization, there is no chance that the oil-soluble polymerization initiator comes into contact with a polymerizable monomer dispersed in the aqueous medium. Therefore, it is possible to suppress generation of extra polymer particles such as dense real particles having a relatively small particle diameter in addition to resin particles having a target hollow portion, by using an oil-soluble polymerization initiator.

(C) Polymerization Step

This step includes subjecting the above-mentioned suspension to a polymerization reaction to prepare a precursor composition containing precursor particles each having a hollow portion and containing a hydrocarbon solvent in the hollow portion.

In the polymerization step, the polymerizable monomer contained in the liquid droplet is polymerized while the polymerizable monomer droplet contains a hydrocarbon solvent inside, whereby a precursor particle having a shell containing a resin which is a polymer of a polymerizable monomer, and a hollow portion filled with a hydrocarbon solvent, is formed.

In the production method of the present disclosure, because, in the polymerization step, the polymerizable monomer droplets are subjected to the polymerization reaction in a condition in which the hydrocarbon solvent is included in the droplets, the polymerization reaction tends to proceed while maintaining the shape of the droplets, and the size and the void ratio of the precursor particles are easily adjusted. In addition, when the polymerizable monomer for shell and the hydrocarbon solvent are used in combination, the polarity of the hydrocarbon solvent is low against the shell of the precursor particles, and the hydrocarbon solvent is incompatible with the shell, so that phase separation is sufficiently generated and only one hollow portion is easily generated. Further, by adjusting the amount of the hydrocarbon solvent, the amount of the polar resin, the type of the dispersant, and the like, it is possible to easily adjust the size and the void ratio of the precursor particles.

There is no particular limitation on the polymerization method performed in the polymerization step. Examples of the polymerization method include a batch type, a semi-continuous type, and a continuous type. The polymerization temperature is preferably 40° C. or more and 80° C. or less, and more preferably 50° C. or more and 70° C. or less. The reaction time of the polymerization is preferably 1 hour or more and 20 hours or less, and more preferably 2 hours or more and 15 hours or less.

(D) Solvent Removal Step

This step includes removing the hydrocarbon solvent included in the precursor particle.

The solvent removal step may be performed without separating the precursor particles from the aqueous medium in the precursor composition obtained by the polymerization step, or may be performed after the solid-liquid separation step in which the precursor particles are separated from the precursor composition. In the solid-liquid separation step, the method of separating the precursor particles from the precursor composition is not particularly limited as long as it is a method of separating a solid content containing the precursor particles from a liquid content containing an aqueous medium, without removing a hydrocarbon solvent included in the precursor particles, and a known method can be used. Examples of the method of solid-liquid separation include a centrifugal separation method, a filtration method, a static separation, and the like. Among them, a centrifugal separation method or a filtration method may be used, and a centrifugal separation method may be used from the viewpoint of simplicity of operation.

Further, after solid-liquid separation, preliminary drying may be performed before removing the hydrocarbon solvent included in the precursor particles in a gaseous atmosphere. The preliminary drying is carried out, for example, by drying a solid content obtained after solid-liquid separation using a drying apparatus such as a dryer or a drying instrument such as a hand dryer.

Here, "in a gaseous atmosphere" includes an environment in which no liquid component is present outside the precursor particles at all, and an environment in which only a very small amount of liquid component is present outside the precursor particles so as not to affect the removal of the hydrocarbon solvent. In other words, "in a gaseous atmosphere" may be referred to as a condition in which the precursor particles are separated from the slurry, or may be referred to as a state in which the precursor particles are present in the dry powder.

A method of removing a hydrocarbon solvent included in the precursor particles in a gaseous atmosphere is not particularly limited, and a known method can be employed. Examples of the method include a reduced pressure drying method, a heat drying method, a flash drying method, and a combination of these methods.

In particular, when a heat drying method is used, it is necessary to set the heating temperature to be equal to or higher than the boiling point of the hydrocarbon solvent and equal to or lower than the maximum temperature at which the shell structure of the obtained hollow particles does not collapse. Therefore, although depending on the composition of the shell and the type of the hydrocarbon solvent, for example, the heating temperature may be 40° C. or more and 200° C. or less.

By the drying operation in a gaseous atmosphere, a hydrocarbon solvent inside the precursor particles is replaced by an external gas, and as a result, hollow particles in which a gas occupies the hollow portions are obtained.

The drying atmosphere is not particularly limited and may be appropriately selected depending on the application of the hollow particles. Examples of the gas for the drying atmosphere include air, oxygen, nitrogen and argon. Heat drying may be performed under a vacuum condition. When the hydrocarbon solvent included in the precursor particles is removed by drying under a vacuum condition, hollow particles in which the inside is a vacuum are obtained temporarily. Hollow particles in which the inside is a vacuum are temporarily obtained also by once filling the inside of the hollow particles with a gas, and then drying them under reduced pressure.

In addition to the above-mentioned steps, the method for producing hollow particles of the present disclosure may further include other steps such as the following (E) washing step, (F) re-substitution step of hollow portion, or the like.

(E) Washing Step

This step includes performing washing by adding an acid or an alkali in order to remove a dispersant remaining in a precursor composition containing precursor particles before the solvent removal step. When the dispersant used is an inorganic compound soluble in an acid, it is preferable to add an acid to the precursor composition containing the precursor particles to perform washing. On the other hand, when the dispersant used is an inorganic compound soluble in an alkali, it is preferable to add an alkali to the precursor composition containing the precursor particles to perform washing.

In addition, when an inorganic compound soluble in an acid is used as a dispersant, it is preferable to add an acid to an aqueous medium dispersion of a precursor composition containing precursor particles and adjust the pH of the precursor composition to preferably 6.5 or less, and more preferably 6 or less. As the acid to be added, inorganic acids such as sulfuric acid, hydrochloric acid and nitric acid, and organic acids such as formic acid and acetic acid can be used. Sulfuric acid is particularly preferable because of the large removal efficiency of the dispersant and the small burden on the manufacturing facility.

(F) Re-Substitution Step of Hollow Portion

This step includes replacing the gas inside the hollow particles with another gas or solvent after the solvent removing step. By the re-substitution step, it is possible to change the environment inside the hollow resin particles, to selectively confine the molecules inside the hollow resin particles, or to modify the chemical structure inside the hollow resin particles according to the application.

In one embodiment of the method for producing hollow particles of the present disclosure described above, as long as it is technically possible, two or more of the above steps may be performed simultaneously as one step or may be performed by replacing the order. For example, suspension is performed at the same time as the material constituting the mixture liquid is added, whereby the preparation of the mixture liquid, and suspension thereof may be performed simultaneously in one step.

II. Resin Composition

The resin composition of the present disclosure contains the hollow particles of the present disclosure, and a resin.

The resin composition of the present disclosure is usually obtained by kneading the hollow particles of the present disclosure, a resin, an additive to be added if necessary, and the like, and may be, for example, a pellet. In the resin composition of the present disclosure, since the hollow particles of the present disclosure are hardly collapsed at the time of kneading and at the time of molding after kneading, an effect such as weight reduction by the hollow particles is exhibited. In addition, since the amount of volatile compounds in the hollow particles contained in the resin composition of the present disclosure is reduced, foaming and ignition caused by the volatile compounds in the hollow particles are suppressed at the time of kneading and at the time of molding after kneading.

The resin used in the resin composition of the present disclosure is not particularly limited, but is preferably a thermoplastic resin or a thermosetting resin.

As the thermoplastic resin, a known one can be used. Examples of the thermoplastic resin include, but are not limited to, polyolefins such as polypropylene and polyethylene; polyamides such as PA6, PA66 and PA12; polyimide, polyamide-imide, polyvinyl chloride, polystyrene, poly(meth)acrylate, polycarbonate, polyvinylidene fluoride, acrylonitrile-butadiene-styrene copolymer (ABS), acrylonitrile-styrene copolymer (AS), polyphenylene ether, polyphenylene sulfide, polyphenylene oxide, polyester, polytetrafluoroethylene, cyanate resins, and thermoplastic elastomers.

Each of these thermoplastic resins may be used alone or in combination of two or more thereof.

As the thermosetting resin, a known one can be used. Examples of the thermosetting resin include, but are not limited to, phenolic resins, melamine resins, urea resins, unsaturated polyester resins, epoxy resins, polyurethane resins, silicone resins, and alkyd resins.

Each of these thermosetting resins may be used alone or in combination of two or more thereof.

When the resin composition of the present disclosure contains a thermosetting resin, it may further contain, if necessary, a cross-linked agent for crosslinking the thermosetting resin by heat, a solvent for dissolving or dispersing each component, and the like. As the crosslinking agent, a known one can be used. The crosslinking agent is appropriately selected according to the type of the thermosetting resin.

The content of the resin per 100% by mass of the total mass of the resin composition of the present disclosure, is not particularly limited, but is usually 70% by mass or more and 99% by mass or less. When the content of the resin is equal to or higher than the lower limit value, moldability when the resin composition is formed into a molded body is excellent, and mechanical strength of the obtained molded body is excellent. On the other hand, when the content of the resin is equal to or lower than the upper limit value, the hollow particles of the present disclosure can be sufficiently contained in the composition, so that the resin composition can be sufficiently reduced in weight.

The content of the hollow particles of the present disclosure per 100% by mass of the total mass of the resin composition of the present disclosure, is not particularly limited, but is usually 1% by mass or more and 30% by mass or less. When the content of the hollow particles is equal to or higher than the lower limit value, the resin composition can be sufficiently reduced in weight. On the other hand, when the content of the hollow particles is equal to or lower than the upper limit value, the resin can be sufficiently contained in the composition, so that moldability can be improved.

In addition to the hollow particles of the present disclosure and the resin, the resin composition of the present disclosure may further contain an additive such as an ultraviolet absorber, a colorant, a heat stabilizer, a filler, or the like, if necessary, within a range not impairing the effect of the present disclosure.

In addition, the resin composition of the present disclosure may further include organic or inorganic fibers such as carbon fibers, glass fibers, aramid fibers or polyethylene fibers.

For example, the resin composition of the present disclosure is obtained, by mixing the hollow particles of the present disclosure, the resin, and, if necessary, an additive to be added, and then kneading the mixture.

The kneading can be performed by a known method. Examples of the kneading apparatus include, but are not limited to, a single-shaft kneader and a twin-shaft kneader.

When the resin in the resin composition of the present disclosure is a thermoplastic resin, the kneading is a melt kneading performed by heating the resin composition to melt a thermoplastic resin. The temperature at the time of melt-kneading may be any temperature at which the thermoplastic resin to be used can be melted. The temperature is not particularly limited, but is preferably 250° C. or less from the viewpoint of suppressing collapse of hollow particles. When the resin composition of the present disclosure is used as a pellet, the resin in the resin composition is usually a thermoplastic resin, and after the melt-kneading, the resin composition can be molded into a pellet shape by a known molding method such as extrusion molding or injection molding.

On the other hand, when the resin in the resin composition of the present disclosure is a thermosetting resin, the kneading may be performed under a temperature which is lower than the curing temperature of the thermosetting resin. The temperature is not particularly limited, but is usually 180° C. or more and 240° C. or less.

III. Molded Body

The molded body of the present disclosure is a molded body of the resin composition of the present disclosure described above.

The molded body of the present disclosure includes the hollow particles of the present disclosure, the collapse of which is suppressed, thereby effectively exhibiting the effect of the hollow particles such as weight reduction.

The molded body of the present disclosure is obtained by molding the resin composition of the present disclosure described above.

For example, when the resin composition of the present disclosure contains a thermoplastic resin, the molded body of the present disclosure can be obtained, by melt-kneading the resin composition of the present disclosure and then molding it into a desired shape by a known molding method such as extrusion molding, injection molding, press molding, or the like. The method of melt kneading performed when obtaining the molded body of the present disclosure may be the same as the method of melt kneading performed when obtaining the resin composition of the present disclosure described above.

On the other hand, when the resin composition of the present disclosure contains a thermosetting resin, the molded body of the present disclosure can be obtained, for example, by applying the resin composition of the present disclosure to a support, drying it if necessary, and then curing it by heating.

Examples of the material of the support include resins such as polyethylene terephthalate and polyethylene naphthalate; and metals such as copper, aluminum, nickel, chromium, gold, and silver.

As a method of applying the resin composition containing a thermosetting resin, a known method such as dip coating, roll coating, curtain coating, die coating, slit coating, gravure coating, or the like can be used.

When the resin composition of the present disclosure contains a solvent, it is preferable that the resin composition of the present disclosure is dried after the coating. The drying temperature is preferably set at a temperature such that the resin composition does not cure, from the viewpoint of removing the solvent while keeping the resin composition in an uncured or semi-cured state. The drying temperature is usually 20° C. or more and 200° C. or less, and preferably 30° C. or more and 150° C. or less. The drying time is usually 30 seconds or more and 1 hour or less, and preferably 1 minute or more and 30 minutes or less.

The temperature of heating for curing the resin composition of the present disclosure is appropriately adjusted according to the type of the thermosetting resin, and is not particularly limited, but is usually 30° C. or more and 400° C. or less, preferably 70° C. or more and 300° C. or less, and more preferably 100° C. or more and 200° C. or less. The curing time is 5 minutes or more and 5 hours or less, and preferably 30 minutes or more and 3 hours or less. The method of heating is not particularly limited, but the heating may be performed by using an electric oven or the like.

There is no particular limitation on the shape of the molded body of the present disclosure, and various shapes can be formed which can be molded using the resin composition of the present disclosure. Examples of the shape of the molded body include a sheet, a film, and a plate. When the molded body of the present disclosure contains fibrous, the fibers in the molded body may be in the form of a nonwoven fabric. When the molded body of the present disclosure contains fibers, it may be a molded body of a resin composition in which hollow particles of the present disclosure are added to a fiber-reinforced plastic containing a resin and fibers as described above.

Examples of an application of the molded body of the present disclosure include light reflecting materials, heat insulating materials, sound insulating materials, low dielectric materials and the like, which are used in various fields such as automobiles, electricity, electronics, construction, aeronautics, space and the like; and food containers.

EXAMPLES

Hereinbelow, the present disclosure will be described in more detail, using Examples and Comparative Examples. However, the present disclosure is not limited to the following examples. In the following description, "part(s)" and "%" are on a mass basis unless otherwise specified.

In the following, measurement of the number average molecular weight was determined as a polystyrene equivalent molecular weight by gel permeation chromatography (GPC) using tetrahydrofuran as a carrier at a flow rate of 0.35 ml/min. HLC8220 manufactured by Tosoh Corporation was used as an apparatus. A concatenation of three columns of Shodex (registered trademark) KF-404HQ manufactured by Showa Denko K.K. was used as a column (column temperature 40° C.). A differential refractometer and an ultraviolet detector were used as detectors. A calibration of the molecular weight was performed at 12 points of standard polystyrene (500 to 3 million) manufactured by Polymer Laboratories Ltd.

Production Example 1: Production of Polar Resin A (MMA/AA/EA Copolymer)

200 parts of toluene was charged into the reaction vessel, and the gas inside of the reaction vessel was sufficiently replaced with nitrogen while stirring toluene, and then the temperature of the toluene was raised to 90° C. Thereafter, a mixed solution of 96.2 parts of methyl methacrylate (MMA), 0.3 parts of acrylic acid (AA), 3.5 parts of ethyl acrylate (EA), and 2.8 parts of t-butylperoxy-2-ethylhexanoate (product name: PERBUTYL 0, manufactured by Nippon Oil & Fats Co., Ltd.) was added dropwise into the reaction vessel over a period of 2 hours. Further, by keeping the condition of the mixture under toluene reflux for 10 hours, the polymerization was completed, and then the solvent was distilled and removed under reduced pressure to obtain a polar resin A (MMA/AA/EA copolymer).

In 100% by mass of the total mass of the repeating units constituting the obtained polar resin A (MMA/AA/EA copolymer), the proportion of the repeating units derived from MMA was 96.2%, that of the repeating units derived from AA was 0.3%, and that of the repeating units derived from EA was 3.5%.

The number average molecular weight of the obtained polar resin A (MMA/AA/EA copolymer) was 10000.

Production Example 2: Production of Polar Resin B (MMA/HEMA/EA Copolymer)

200 parts of toluene was charged into the reaction vessel, and the gas inside of the reaction vessel was sufficiently replaced with nitrogen while stirring toluene, and then the temperature of the toluene was raised to 90° C. Thereafter, a mixed solution of 95.0 parts of methyl methacrylate (MMA), 3.0 parts of 2-hydroxyethyl methacrylate (HEMA), 2.0 parts of ethyl acrylate (EA), and 2.8 parts of t-butylperoxy-2-ethylhexanoate (product name: PERBUTYL 0, manufactured by Nippon Oil & Fats Co., Ltd.) was added dropwise into the reaction vessel over a period of 2 hours. Further, by keeping the condition of the mixture under toluene reflux for 10 hours, the polymerization was completed, and then the solvent was distilled and removed under reduced pressure to obtain a polar resin B (MMA/HEMA/EA copolymer).

In 100% by mass of the total mass of the repeating units constituting the obtained polar resin B (MMA/HEMA/EA copolymer), the proportion of the repeating units derived from MMA was 95.0%, that of the repeating units derived from HEMA was 3.0%, and that of the repeating units derived from EA was 2.0%.

The number average molecular weight of the obtained polar resin B (MMA/HEMA/EA copolymer) was 10000.

[Polar Resin C (PMMA)]

200 parts of toluene was charged into the reaction vessel, and the gas inside of the reaction vessel was sufficiently replaced with nitrogen while stirring toluene, and then the temperature of the toluene was raised to 90° C. Thereafter, a mixed solution of 100 parts of methyl methacrylate (MMA) and 2.8 parts of t-butylperoxy-2-ethylhexanoate (product name: PERBUTYL O, manufactured by Nippon Oil & Fats Co., Ltd.) was added dropwise into the reaction vessel over a period of 2 hours. Further, by keeping the condition of the mixture under toluene reflux for 10 hours, the polymerization was completed, and then the solvent was distilled and removed under reduced pressure to obtain a polar resin C (PMMA) which is a homopolymer of MMA.

The number average molecular weight of the obtained polar resin C (PMMA) was 6000.

Example 1

(1) Mixture Liquid Preparation Step

First, the following materials were mixed, and the obtained mixture was used as an oil phase.
Ethylene glycol dimethacrylate: 100 parts
Polar resin A (MMA/AA/EA copolymer): 2 parts
2,2'-Azobis(2,4-dimethylvaleronitrile) (Oil-soluble initiator, product name: V-65, manufactured by Wako Pure Chemical Industries, Ltd.): 3 parts
Cyclohexane: 187 parts On the other hand, in a stirring tank, an aqueous solution in which 5.5 parts of sodium hydroxide (alkali metal hydroxide) was dissolved in 55 parts of ion-exchanged water was gradually added under stirring to an aqueous solution in which 7.8 parts of magnesium chloride (water-soluble polyvalent metal salt) was dissolved in 225 parts of ion-exchanged water under room temperature to prepare a magnesium hydroxide colloid (sparingly water-soluble metal hydroxide colloid) dispersion, which was used as an aqueous phase.

A mixture liquid was prepared by mixing the aqueous phase and the oil phase.

(2) Suspension Step

The mixture liquid obtained in the above mixture liquid preparation step was suspended by stirring under a condition of a rotation speed of 4000 rpm for 1 minute by a disperser (product name: HOMOMIXER, manufactured by PRIMIX Corporation), thereby a suspension in which monomer droplets including cyclohexane were dispersed in water was prepared.

(3) Polymerization Step

A polymerization reaction was carried out by stirring the suspension obtained in the above suspension step under a temperature condition of 65° C. in a nitrogen atmosphere for 4 hours. By this polymerization reaction, a precursor composition containing precursor particles including cyclohexane was prepared.

(4) Washing Step and Solid-Liquid Separation Step

The precursor composition obtained in the above polymerization step was washed with dilute sulfuric acid at 25° C. for 10 minutes to bring the pH to 5.5 or less. Then, after separating water from the composition by filtration, 200 parts of ion-exchanged water was newly added to the obtained solid content to be re-slurried, and a water washing treatment (washing, filtration, and dehydration) was repeated several times at 25° C., followed by filtration separation to obtain the solid content. The obtained solid content was dried at a temperature of 40° C. in a dryer to obtain precursor particles including cyclohexane.

(5) Solvent Removal Step

The precursor particles obtained in the above solid-liquid separation step were heat-treated in a vacuum dryer at 200° C. for 6 hours under a vacuum condition, and then brought to normal pressure by nitrogen, and cooled to room temperature to obtain hollow particles of Example 1. From the observation result by a scanning electron microscope and the value of the void ratio, it was confirmed that these particles were spherical and each of the particles had a hollow portion.

Examples 2 to 10, Comparative Examples 1 to 7

Hollow particles of Examples 2 to 10 and hollow particles of Comparative Examples 1 to 7 were obtained by a similar procedure to Example 1, except that the composition of the oil phase prepared in the above "(1) mixture liquid preparation step" was set as shown in Table 1.

[Evaluation]

The hollow particles obtained in Examples 1 to 10 and Comparative Example 1 to 7 were measured and evaluated as follows.

1. Volume Average Particle Diameter of Hollow Particles

The particle diameter of each hollow particle was measured using a laser diffraction particle size distribution measuring apparatus (product name: SALD-2000, manufactured by Shimadzu Corporation), and the volume average thereof was calculated to obtain a volume average particle diameter.

2. Density and Void Ratio of Hollow Particles 2-1. Measurement of Apparent Density of Hollow Particles First, approximately 30 cm³ of hollow particles were introduced in a 100 cm³ volumetric flask, and the mass of the introduced hollow particles was precisely weighed. Next, the volumetric flask, in which the hollow particles were introduced, was precisely filled with isopropanol to the target line, taking care not to allow air bubbles to enter. The mass of the isopropanol added to the volumetric flask was precisely weighed, and the apparent density $D_1$ (g/cm³) of the hollow particles was calculated on the basis of the following formula (I).

Apparent density $D_1$=[Mass of hollow particles]/ (100−[Mass of isopropanol]/[Specific gravity of isopropanol at measured temperature])  Formula (I)

2-2. Measurement of True Density of Hollow Particles

After pulverizing the hollow particles in advance, approximately 10 g of the pulverized piece of hollow particles were introduced in a 100 cm³ volumetric flask, and the mass of the introduced pulverized piece was precisely weighed.

Thereafter, isopropanol was added to the volumetric flask in the same manner as the above-mentioned measurement of the apparent density, and the mass of the isopropanol was precisely weighed, and the true density $D_0$ (g/cm³) of the hollow particles was calculated on the basis of the following formula (II).

True density $D_0$=[Mass of pulverized pieces of hollow particle]/(100−[Mass of isopropanol]/[Specific gravity of isopropanol at measured temperature])  Formula (II)

2-3. Calculation of Void Ratio

The apparent density $D_1$ was divided by the true density $D_0$, and then multiplied by 100 and the obtained value was subtracted from 100 to calculate the void ratio (%).

3. Shell Thickness of Hollow Particles

The inner diameter r of the hollow particles was calculated from the following formula (1) using the volume average particle diameter R and the void ratio of the hollow particles, and the thickness of the shell of the hollow particles was calculated from the following formula (2) using the inner diameter r and the volume average particle diameter R.

$\frac{4}{3}\pi \times (R/2)^3 \times$ Void ratio=$\frac{4}{3}\pi \times (r/2)^3$  Formula (1)

Shell Thickness=$(R−r)/2$  Formula (2)

4. Amount of Volatile Compounds in the Hollow Particles

The amount of volatile compounds in the hollow particles was measured by the following method.

Approximately 100 mg of hollow particles were put into a 30 mL screw cap glass bottle, and were precisely weighed. Subsequently, approximately 10 g of tetrahydrofuran (THF) was put in, and were precisely weighed. The mixture in the glass bottle was stirred for 1 hour with a stirrer, and volatile compounds such as hydrocarbon solvents (e.g., cyclohexane (boiling point: 80.74° C., molecular weight: 84.16), ethylene glycol dimethacrylate (boiling point: 235° C., molecular weight: 198.22), methyl methacrylate (boiling point: 101° C., molecular weight: 100.12), and the like) contained in the hollow particles, were extracted. The stirring was stopped, and the resin component of the hollow particles insoluble in THF was precipitated. Then, a filter (product name: MEM-BRANE FILTER 25JP020AN, manufactured by Advantec Co., Ltd.) was mounted on a syringe and a precipitate was filtered, and thereby a sample liquid was obtained. The sample liquid was injected into gas chromatography (GC) to be analyzed. The amount of volatile compounds per unit mass (% by mass) contained in the hollow particles was determined from the peak area of GC and a calibration curve prepared in advance. Detailed analysis conditions were as follows.

(Analysis Conditions)

Apparatus: GC-2010 (manufactured by Shimadzu Corporation)
Column: DB-5 (manufactured by Agilent Technologies Japan, Ltd.)
Film thickness: 0.25 µm, Inner diameter: 0.25 mm, Length: 30 m
Detector: FID
Carrier gas: Nitrogen (linear velocity: 28.8 cm/sec)
Injection port temperature: 200° C.
Detector temperature: 250° C.
Oven temperature: Raised from 40° C. to 230° C. at a rate of 10° C./min, and held at 230° C. for 2 minutes
Sampling volume: 2 µL

[Results]

Table 1 shows the types and added amounts of the materials used in Examples 1 to 10 and Comparative Examples 1 to 7, and the evaluation results of the obtained hollow particles.

TABLE 1

| | | | Example 1 | Example 2 | Example 3 | Example 4 | Example 5 | Example 6 | Example 7 | Example 8 | Example 9 |
|---|---|---|---|---|---|---|---|---|---|---|---|
| Oil phase | Non-cross-linkable monomer | Methyl methacrylate (parts) | — | — | — | — | — | — | 20 | 30 | — |
| | Cross-linkable monomer | Ethylene glycol dimethacrylate (parts) | 100 | 100 | 100 | 100 | 100 | 100 | 80 | 70 | 100 |
| | Oil-soluble polymerization initiator | V-65 (parts) | 3 | 3 | 3 | 3 | 3 | 3 | 3 | 3 | 3 |
| | Hydrocarbon solvent | Cyclohexane (parts) | 187 | 83.5 | 187 | 187 | 187 | 187 | 187 | 187 | 187 |
| | | Hexadecane (parts) | — | — | — | — | — | — | — | — | — |
| | Polar resin | MMA/AA/EA (parts) | 2 | 2 | 1 | 0.5 | — | — | 2 | 2 | 8 |
| | | MMA/HEMA/EA (parts) | — | — | — | — | 1 | — | — | — | — |
| | | PMMA (parts) | — | — | — | — | — | 0.5 | — | — | — |
| Aqueous phase | Dispersant | Magnesium hydroxide (parts) | 4 | 4 | 4 | 4 | 4 | 4 | 4 | 4 | 4 |
| | | Sodium dodecylbenzene sulfonate (parts) | — | — | — | — | — | — | — | — | — |
| | | Polyvinyl alcohol (parts) | — | — | — | — | — | — | — | — | — |
| | | Ion-exchanged water (parts) | 280 | 280 | 280 | 280 | 280 | 280 | 280 | 280 | 280 |
| Hollow particles | | Volume average particle diameter (µm) | 5.5 | 5.2 | 6.5 | 8.8 | 5.8 | 9.2 | 5.4 | 5.2 | 5.1 |
| | | Shell thickness (µm) | 0.30 | 0.40 | 0.35 | 0.50 | 0.30 | 0.50 | 0.30 | 0.30 | 0.30 |
| | | Apparent density $D_1$ (g/cm$^3$) | 0.36 | 0.48 | 0.36 | 0.36 | 0.36 | 0.36 | 0.36 | 0.36 | 0.38 |
| | | True density $D_0$ (g/cm$^3$) | 1.20 | 1.20 | 1.20 | 1.20 | 1.20 | 1.20 | 1.20 | 1.20 | 1.20 |
| | | Void ratio (%) | 70 | 60 | 70 | 70 | 70 | 70 | 70 | 70 | 70 |
| | | Amount of volatile compounds (% by mass) | 0.05 | 0.09 | 0.08 | 0.12 | 0.08 | 0.14 | 0.04 | 0.03 | 0.03 |

TABLE 1-continued

|  |  |  | Example 10 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|
| Oil phase | Non-cross-linkable monomer | Methyl methacrylate (parts) | — | 40 | — | — | — | 30 | — | — |
|  | Cross-linkable monomer | Ethylene glycol dimethacrylate (parts) | 100 | 60 | 100 | 100 | 100 | 70 | 100 | 100 |
|  | Oil-soluble polymerization initiator | V-65 (parts) | 3 | 3 | 3 | 3 | 3 | 3 | 3 | 3 |
|  | Hydrocarbon solvent | Cyclohexane (parts) | 455 | 187 | 45 | 187 | 610 | 187 | 187 | — |
|  |  | Hexadecane (parts) | — | — | — | — | — | — | — | 83.5 |
|  | Polar resin | MMA/AA/EA (parts) | 0.5 | 2 | 1 | — | 1 | — | 2 | — |
|  |  | MMA/HEMA/EA (parts) | — | — | — | — | — | — | — | — |
|  |  | PMMA (parts) | — | — | — | — | — | — | — | — |
| Aqueous phase | Dispersant | Magnesium hydroxide (parts) | 8 | 4 | 4 | 4 | 16 | 4 | — | — |
|  |  | Sodium dodecylbenzene sulfonate (parts) | — | — | — | — | — | — | 3 | — |
|  |  | Polyvinyl alcohol (parts) | — | — | — | — | — | — | — | 3 |
|  | Ion-exchanged water (parts) |  | 560 | 280 | 280 | 280 | 1120 | 280 | 280 | 280 |
| Hollow particles | Volume average particle diameter (μm) |  | 9.0 | 5.0 | 7.2 | 15.2 | 6.2 | 15.5 | 3.2 | 11.0 |
|  | Shell thickness (μm) |  | 0.25 | 0.30 | 0.95 | 1.20 | 0.10 | 1.20 | 0.17 | 0.95 |
|  | Apparent density $D_1$ (g/cm$^3$) |  | 0.18 | 0.36 | 0.60 | 0.36 | 0.12 | 0.36 | 0.36 | 0.36 |
|  | True density $D_0$ (g/cm$^3$) |  | 1.20 | 1.20 | 1.20 | 1.20 | 1.19 | 1.19 | 1.19 | 1.20 |
|  | Void ratio (%) |  | 85 | 70 | 40 | 70 | 92 | 70 | 70 | 60 |
|  | Amount of volatile compounds (% by mass) |  | 0.02 | 0.02 | 20.3 | 50.7 | 0.02 | 45.2 | 0.02 | 35.6 |

Each 100 particles of the hollow particles obtained in Examples 1 to 10 were observed by SEM. In each hollow particle, the presence or the absence of a communication hole having a diameter of approximately 10 nm or more and 500 nm or less and of a crack-shaped shell defect having a length of 1 μm or more, was confirmed. As a result, in all of the hollow particles obtained in any of the Examples, the number of the hollow particles having the communication hole or the shell defect was 5 or less out of 100. Thus, it was confirmed that hollow particles that were substantially free of communication holes and shell defects were obtained in Examples 1 to 10.

Example 11

90 parts of polypropylene (product name: MA1B, manufactured by Mitsubishi Chemical Corporation, specific gravity: 0.90 g/cm$^3$) as a thermoplastic resin and 10 parts of hollow particles obtained in Example 1 were mixed in a blender. Then, using a two-axis kneader (product name: TEM-35B, manufactured by Toshiba Machine Co., Ltd.), kneading of the mixture was performed under the following kneading conditions, and the kneaded mixture was extruded and pelletized to obtain pellets of the resin composition.
<Kneading Conditions>
Screw diameter: 37 mm, L/D=32
Screw rotational speed: 250 rpm
Resin temperature: 190° C.
Feed rate: 20 kg/h The obtained pellets of the resin composition were heated and dried at 80° C. for 6 hours. Then, using an injection molding apparatus, the pellets were molded under the following molding conditions to obtain a molded body having a dimension of 80 mm×10 mm×thickness of 4 mm. The specific gravity of the obtained molded body was measured by the underwater replacement method in accordance with JIS K 7112.
<Molding Conditions>
Cylinder temperature: 230° C.
Mold temperature: 40° C.
Injection pressure: 70 MPa Examples 12 to 22, Comparative Examples 8 to 10

Resin compositions and molded bodies of Examples 12 to 22 and Comparative Examples 8 to 10 were obtained by a similar procedure to Example 11, except that hollow particles obtained in the Example or the Comparative example shown in Table 2 were used instead of hollow particles obtained in Example 1, and furthermore in Example 21 and 22, PA-6 (product name: A1020BRL, manufactured by Unitika Ltd., specific gravity: 1.13 g/cm$^3$) was used instead of polypropylene as a thermoplastic resin.

Comparative Example 11

A resin composition and a molded body of Comparative Example 11 were obtained by a similar procedure to Example 11, except that the added amount of polypropylene was changed to 80 parts and 20 parts of glass balloons (product name: GLASS BUBBLES iM30K, manufactured by 3M Japan Limited) was used instead of 10 parts of hollow particles obtained in Example 1.

The weight reduction rate and the specific gravity increase rate of the molded bodies obtained in Examples 11 to 22 and Comparative Examples 8 to 11 were calculated by the following formulae.

Weight reduction rate (%)=100×(1−Specific gravity of molded body/Specific gravity of thermoplastic resin alone)

Specific gravity increase rate (%)=100×(Specific gravity of molded body/Theoretical specific gravity of resin composition−1)

The theoretical specific gravity of the resin composition was determined from the weight ratio of the thermoplastic resin and that of the hollow particles, and specific gravities of each of them (apparent density $D_1$ for the hollow particles).

The specific gravity increase rate is an indicator for evaluating the degree to which the hollow particles collapse during kneading and molding of the resin composition. When the hollow particles in the resin composition are not collapsed at all at the time of kneading and molding, the specific gravity increase rate becomes 0%, since the specific gravity of the obtained molded body and the theoretical specific gravity of the resin composition become the same. Therefore, the smaller the specific gravity increase rate, the hollow particles are hardly collapsed during kneading and molding of the resin composition.

In Comparative Example 1, the content of the crosslinkable monomer was 60% by mass and the content of the non-crosslinkable monomer was 40% by mass with respect to 100% by mass of the polymerizable monomer for shell. Since the proportion of the crosslinkable monomer was small and the proportion of the non-crosslinkable monomer was large, the hollow particles of Comparative Example 1 were easily collapsed during kneading with the thermoplastic resin and during molding after kneading. Therefore, as shown in Comparative Example 8, the molded body to which the hollow particles of Comparative Example 1 were added had a low weight reduction rate and a high specific gravity increase rate.

Regarding Comparative Example 2, the hollow particles had a low void ratio of 40% and had a shell thickness of more than 0.9 µm, so that the amount of volatile compounds remained in the particles was large.

Regarding Comparative Example 3, 5 and 7, the hollow particles did not contain a polar resin, and had a shell thickness of more than 0.9 µm, so that the amount of volatile compounds remained in the particles was large.

Regarding Comparative Example 4, the hollow particles had a high void ratio of 92% and a shell thickness of less than 0.2 µm, so that the particles easily collapsed at the time of kneading with a thermoplastic resin and at the time of molding after kneading. Therefore, as shown in Comparative Example 9, the molded body to which the hollow particles of Comparative Example 4 were added had a low weight reduction rate and a high specific gravity increase rate.

Regarding Comparative Example 6, the hollow particles had a shell thickness of less than 0.2 µm, so that the particles easily collapsed at the time of kneading with the thermoplastic resin and at the time of molding after kneading.

TABLE 2

| | Resin composition | | | Theoretical specific gravity of resin composition (g/cm³) | Specific gravity of molded body (g/cm³) | Weight reduction rate (%) | Specific gravity increase rate (%) |
|---|---|---|---|---|---|---|---|
| | Thermoplastic resin | | Hollow particles | | | | |
| | Type | (parts) | Type | (parts) | | | | |
| Example 11 | PP | 90 | Example 1 | 10 | 0.846 | 0.852 | 5.3 | 0.7 |
| Example 12 | PP | 90 | Example 2 | 10 | 0.858 | 0.860 | 4.4 | 0.2 |
| Example 13 | PP | 90 | Example 3 | 10 | 0.846 | 0.850 | 5.6 | 0.5 |
| Example 14 | PP | 90 | Example 4 | 10 | 0.846 | 0.851 | 5.4 | 0.6 |
| Example 15 | PP | 90 | Example 5 | 10 | 0.846 | 0.856 | 4.9 | 1.2 |
| Example 16 | PP | 90 | Example 6 | 10 | 0.846 | 0.854 | 5.1 | 0.9 |
| Example 17 | PP | 90 | Example 7 | 10 | 0.846 | 0.855 | 5.0 | 1.1 |
| Example 18 | PP | 90 | Example 8 | 10 | 0.846 | 0.858 | 4.7 | 1.4 |
| Example 19 | PP | 90 | Example 9 | 10 | 0.846 | 0.865 | 3.9 | 2.2 |
| Example 20 | PP | 90 | Example 10 | 10 | 0.828 | 0.860 | 3.9 | 4.0 |
| Example 21 | PA-6 | 90 | Example 1 | 10 | 1.053 | 1.062 | 6.0 | 0.9 |
| Example 22 | PA-6 | 90 | Example 2 | 10 | 1.065 | 1.070 | 5.3 | 0.5 |
| Comparative Example 8 | PP | 90 | Comparative Example 1 | 10 | 0.846 | 0.870 | 3.3 | 2.8 |
| Comparative Example 9 | PP | 90 | Comparative Example 4 | 10 | 0.822 | 0.890 | 1.1 | 8.3 |
| Comparative Example 10 | PP | 90 | Comparative Example 6 | 10 | 0.846 | 0.890 | 1.0 | 5.0 |
| Comparative Example 11 | PP | 80 | glass balloons | 20 | 0.840 | 0.900 | 0.0 | 7.1 |

[Discussion]

Hereinafter, referring to Tables 1 and 2, the hollow particles of Examples 1 to 10 and Comparative Examples 1 to 7 are examined.

Therefore, as shown in Comparative Example 10, the molded body to which the hollow particles of Comparative Example 6 were added had a low weight reduction rate and a high specific gravity increase rate.

The molded body of Comparative Example 11 to which glass balloons were added instead of the hollow particles of the present disclosure, had a low weight reduction rate and a high specific gravity increase rate. The reason of this is considered that the glass balloons were not able to withstand the load during kneading and molding after kneading, and broken.

On the other hand, the hollow particles of Examples 1 to 10 had a void ratio of 50% or more and 90% or less, which is a moderately high void ratio, and the shell thickness of 0.2 µm or more and 0.9 µm or less, and the shell of the hollow particles contained a polymer derived from a polymeric monomer for shell consisting of a cross-linkable monomer of 70% by mass or more and 100% by mass or less and a non-crosslinkable monomer of 0% by mass or more and 30% by mass or less, and a polar resin. Therefore, the amount of volatile compounds in the hollow particles was small, and the hollow particles hardly collapsed at the time of kneading with a thermoplastic resin and at the time of molding after kneading. As shown in Examples 11 to 22, the molded bodies to which hollow particles of Examples 1 to 10 were added had a high weight reduction rate and a low specific gravity increase rate. This has revealed that the hollow particles of Examples 1 to 10 are useful as a weight reducing material.

The invention claimed is:

1. Hollow particles comprising:
a shell having a thickness of 0.2 µm or more and 0.9 µm or less, wherein the shell comprises:
a polymer derived from a polymerizable monomer for shell, which is composed of 70% by mass or more and 100% by mass or less of a crosslinkable monomer and 0% by mass or more and 30% by mass or less of a non-crosslinkable monomer; and
a polar resin selected from the group consisting of polymers containing a repeating unit which contains a hetero atom, wherein a content of the polar resin is 0.1 parts by mass or more and 10.0 parts by mass or less per 100 parts by mass of the polymerizable monomer for shell; and
a hollow portion surrounded by the shell,
wherein the hollow particles have a void ratio of 50% or more and 90% or less.

2. The hollow particles according to claim 1, wherein the polar resin is an acrylic resin.

3. The hollow particles according to claim 2, wherein the acrylic resin as the polar resin is a copolymer derived from polymerizable monomers for polar resin, wherein the polymerizable monomers for polar resin comprise 50.0% by mass or more and 99.9% by mass or less of a methyl methacrylate and 0.1% by mass or more and 5.0% by mass or less of a polar group-containing monomer containing at least one polar group selected from a carboxyl group, a hydroxyl group, a sulfonic acid group, an amino group, a polyoxyethylene group and an epoxy group.

4. A resin composition comprising the hollow particles defined by claim 1, and a resin.

5. A molded body of the resin composition defined by claim 4.

* * * * *